(12) United States Patent
Sogabe

(10) Patent No.: US 10,802,106 B2
(45) Date of Patent: Oct. 13, 2020

(54) VEHICLE COMMUNICATION CONTROL DEVICE

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 79 days.

(21) Appl. No.: 16/084,275

(22) PCT Filed: Feb. 22, 2017

(86) PCT No.: PCT/JP2017/006451
§ 371 (c)(1),
(2) Date: Sep. 12, 2018

(87) PCT Pub. No.: WO2017/159238
PCT Pub. Date: Sep. 21, 2017

(65) Prior Publication Data
US 2019/0079161 A1   Mar. 14, 2019

(30) Foreign Application Priority Data

Mar. 18, 2016   (JP) ................................ 2016-055973

(51) Int. Cl.
*G01S 5/14* (2006.01)
*G08G 1/09* (2006.01)
(Continued)

(52) U.S. Cl.
CPC .............. *G01S 5/14* (2013.01); *G01S 5/0226* (2013.01); *G01S 5/0236* (2013.01);
(Continued)

(58) Field of Classification Search
CPC .. G08G 1/096791; G08G 1/161; G08G 1/163; G08G 1/167
(Continued)

(56) References Cited

U.S. PATENT DOCUMENTS

| 5,529,139 A * | 6/1996 | Kurahashi .......... B60K 31/0008 |
| | | 180/169 |
| 7,769,498 B2 * | 8/2010 | Isaji ......................... B60T 7/14 |
| | | 701/1 |

(Continued)

FOREIGN PATENT DOCUMENTS

| JP | 2010108344 A | 5/2010 |
| JP | 2013005186 A | 1/2013 |

*Primary Examiner* — Emily C Terrell
(74) *Attorney, Agent, or Firm* — Harness, Dickey & Pierce, P.L.C.

(57) ABSTRACT

A vehicle communication control device used for a vehicle includes a nearby vehicle information acquirer, a subject vehicle information generator, an assistance information generator, a difference calculator, and a cycle changer. The nearby vehicle information acquirer successively acquires nearby vehicle information representing running condition of a nearby vehicle and generation time of the nearby vehicle information. The subject vehicle information generator cyclically generates subject vehicle information representing running condition of a subject vehicle. The assistance information generator generates assistance information for driving assistance of the subject vehicle by using the nearby vehicle information and the subject vehicle information. The difference calculator calculates a difference between generation time of the most recent subject vehicle information and generation time of the most recent nearby vehicle information. The cycle changer changes a generation cycle of the subject vehicle information so as to decrease the difference.

10 Claims, 6 Drawing Sheets

(51) Int. Cl.
  *G08G 1/16*  (2006.01)
  *G01S 5/02*  (2010.01)
(52) U.S. Cl.
  CPC .......... *G01S 5/0242* (2013.01); *G01S 5/0284* (2013.01); *G08G 1/09* (2013.01); *G08G 1/163* (2013.01)
(58) Field of Classification Search
  USPC ................................................ 340/438, 435
  See application file for complete search history.

(56) References Cited

U.S. PATENT DOCUMENTS

| | | | |
|---|---|---|---|
| 2007/0117525 A1* | 5/2007 | Osafune | H04W 4/026 |
| | | | 455/99 |
| 2011/0019577 A1* | 1/2011 | Nagura | H04L 1/1657 |
| | | | 370/252 |
| 2012/0101704 A1 | 4/2012 | Wagner | |
| 2012/0323476 A1 | 12/2012 | Funabashi | |
| 2013/0342368 A1 | 12/2013 | Nathanson | |
| 2015/0269845 A1 | 9/2015 | Calmettes et al. | |
| 2016/0071417 A1 | 3/2016 | Lewis et al. | |
| 2017/0110011 A1* | 4/2017 | Tonguz | G08G 1/161 |
| 2017/0243485 A1* | 8/2017 | Rubin | G08G 1/052 |

\* cited by examiner

VEHICLE COMMUNICATION CONTROL DEVICE

CROSS REFERENCE TO RELATED APPLICATIONS

This application is a U.S. National Phase Application under 35 U.S.C. 371 of International Application No. PCT/JP2017/006451 filed on Feb. 22, 2017 and published in Japanese as WO/2017/159238 A1 on Sep. 21, 2017. This application is based on and claims the benefit of priority from Japanese Patent Application No. 2016-055973 filed on Mar. 18, 2016. The entire disclosures of all of the above applications are incorporated herein by reference.

TECHNICAL FIELD

The present disclosure relates to a vehicle communication control device that acquires, via communication, information of a nearby vehicle used for driving assistance of a subject vehicle.

BACKGROUND ART

Patent Literature 1 discloses the technology that performs driving assistance of a subject vehicle by using vehicle information of a different vehicle acquired via communication from the different vehicle and vehicle information of the subject vehicle acquired in the subject vehicle. The technology disclosed in Patent Literature 1 calculates a time delay until the nearby vehicle affects the subject vehicle based on a position of the nearby vehicle and a position of the subject vehicle. The position of the nearby vehicle is generated from a navigation system of the nearby vehicle and is acquired from the nearby vehicle through inter-vehicle communication. The position of the subject vehicle is acquired from a GPS of the subject vehicle. A nearby vehicle targeted at driving assistance is prioritized for determination based on the calculated time delay. The driving assistance is performed to preferentially notify a driver of information about a highly prioritized nearby vehicle.

PRIOR ART LITERATURE

Patent Literature

Patent literature 1: JP 2010-108344 A

SUMMARY OF INVENTION

Generally, however, there is no synchronization between a cycle to acquire the position of the nearby vehicle in the navigation system of the nearby vehicle and a cycle to acquire the position of the subject vehicle by using the GPS of the subject vehicle. According to the technology disclosed in Patent Literature 1, the positional relation between the subject vehicle and the nearby vehicle differs from the actual positional relation by at least a difference between the cycle to acquire the position of the nearby vehicle and the cycle to acquire the position of the subject vehicle. A calculated time delay differs from the actual one. As a result, the varied time delay causes the timing of the driving assistance based on the time delay to differ from the timing a user feels proper. A driver may feel unsatisfied with the driving assistance.

It is an object of the present disclosure to provide a vehicle communication control device capable of minimizing dissatisfaction of a driver with driving assistance using vehicle information of a nearby vehicle acquired by communication from outside a subject vehicle and vehicle information of the subject vehicle acquired in the subject vehicle.

According to an aspect of the present disclosure, a vehicle communication control device is used for a vehicle and includes a nearby vehicle information acquirer, a subject vehicle information generator, an assistance information generator, a difference calculator, and a cycle changer. The nearby vehicle information acquirer is configured to successively acquire nearby vehicle information representing a running condition of at least one nearby vehicle around a subject vehicle and generation time of the nearby vehicle information. The nearby vehicle information and the generation time are generated in an in-vehicle unit mounted on the at least one nearby vehicle and successively transmitted by communication from outside the subject vehicle. The subject vehicle information generator is configured to cyclically generate subject vehicle information representing a running condition of the subject vehicle. The assistance information generator is configured to generate assistance information for driving assistance of the subject vehicle by using the nearby vehicle information and the subject vehicle information. The difference calculator is configured to calculate a difference between generation time of the most recent subject vehicle information and generation time of the most recent nearby vehicle information. The cycle changer is configured to change a generation cycle of the subject vehicle information in the subject vehicle information generator so as to decrease the difference.

According to the aspect of the present disclosure, the generation cycle of the subject vehicle information is changed so as to reduce the difference between the generation time of the most recent nearby vehicle information concerning the targeted nearby vehicle and the generation time of the most recent subject vehicle information. As such, the difference is decreased.

When the difference between the generation time of the nearby vehicle information and the generation time of the subject vehicle information is decreased, the assistance information generated in the assistance information generator by using these pieces of information therefore more accurately reflects the actual running condition relation between the subject vehicle and the nearby vehicle. The driving assistance using the assistance information can therefore more accurately reflect the actual running condition relation between the subject vehicle and the nearby vehicle. As a result, it is possible to minimize dissatisfaction of a driver with the driving assistance using vehicle information of the nearby vehicle acquired by communication from outside the subject vehicle and vehicle information of the subject vehicle acquired in the subject vehicle.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
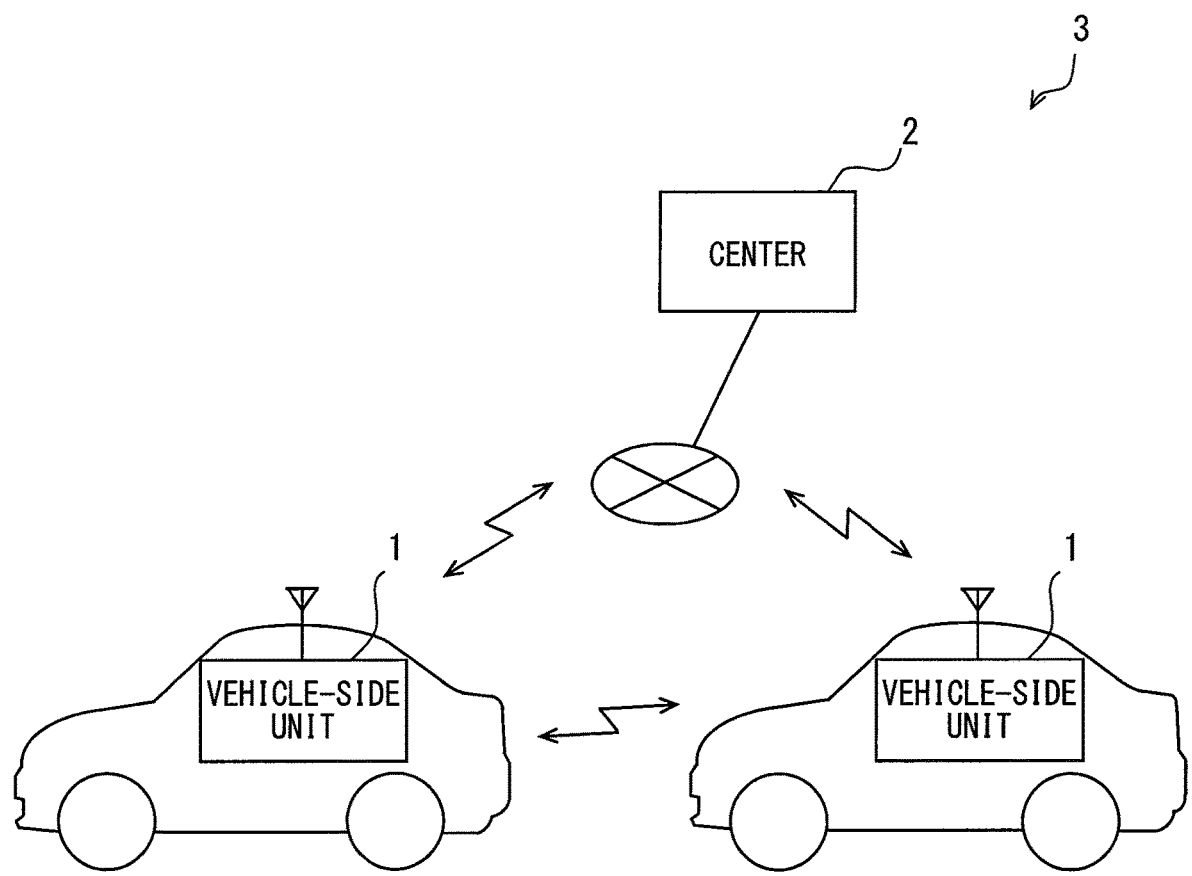
FIG. 1 is a diagram illustrating an example of a schematic configuration of a driving assistance system.

Embodiments and modifications for the disclosure will be described with reference to the accompanying drawings. The same reference numerals may be given to parts having the same functions illustrated in the drawings used to describe the embodiments and the modifications hitherto and the related description may be omitted for convenience sake. The parts given the same reference numerals can be made clear by reference to the description in the other embodiments and/or modifications.

Embodiments and modifications described below are applicable to regions legislating driving on the left-hand side of the road. Regions legislating driving on the right-hand side of the road requires reversing the descriptions about the right and the left in the embodiments below.

First Embodiment

<Schematic Configuration of Driving assistance System 3>

The description below explains a first embodiment of the present disclosure with reference to the accompanying drawings. As illustrated in FIG. 1, a driving assistance system 3 includes a vehicle-side unit 1 and a center 2. The vehicle-side unit 1 is mounted on each of a plurality of vehicles.

The vehicle-side unit 1 communicates with the vehicle-side unit 1 mounted on a nearby vehicle around a subject vehicle and communicates with the center 2. The center 2 is available as a server, for example. The center 2 acquires vehicle information transmitted from the vehicle-side unit 1 of a certain vehicle via a public telecommunication network and transfers the vehicle information to the vehicle-side unit 1 of another vehicle. The driving assistance system 3 allows the vehicle-side units 1 to directly communicate with each other or to indirectly communicate with each other via the center 2.

Direct communication between the vehicle-side units 1 (hereinafter referred to as inter-vehicle communication) may use a radio wave of 760 MHz band and may comply with the communication standard of WAVE (Wireless Access in Vehicular Environment). The inter-vehicle communication may use other frequency bands such as 2.4 GHz and 5.9 GHz for radio waves. The inter-vehicle communication may use communication standards other than WAVE.

Communication between the vehicle-side units 1 via the center 2 (hereinafter referred to as communication via the center) may use public telecommunication networks such as a mobile telephone network and the Internet. The center 2 manages a vehicle position of each vehicle by successively updating and storing the vehicle position contained in the vehicle information successively transmitted from the vehicle-side unit 1 of each vehicle. Suppose the center 2 acquires the vehicle information transmitted from the vehicle-side unit 1 of a certain vehicle. In this case, the communication via the center specifies nearby vehicles located around the vehicle based on the vehicle position contained in the vehicle information and the managed vehicle position of each vehicle and transfers the acquired vehicle information to the nearby vehicles. The center 2 may include one or more servers.

<Schematic Configuration of Vehicle-Side Unit 1>

Figure 2:
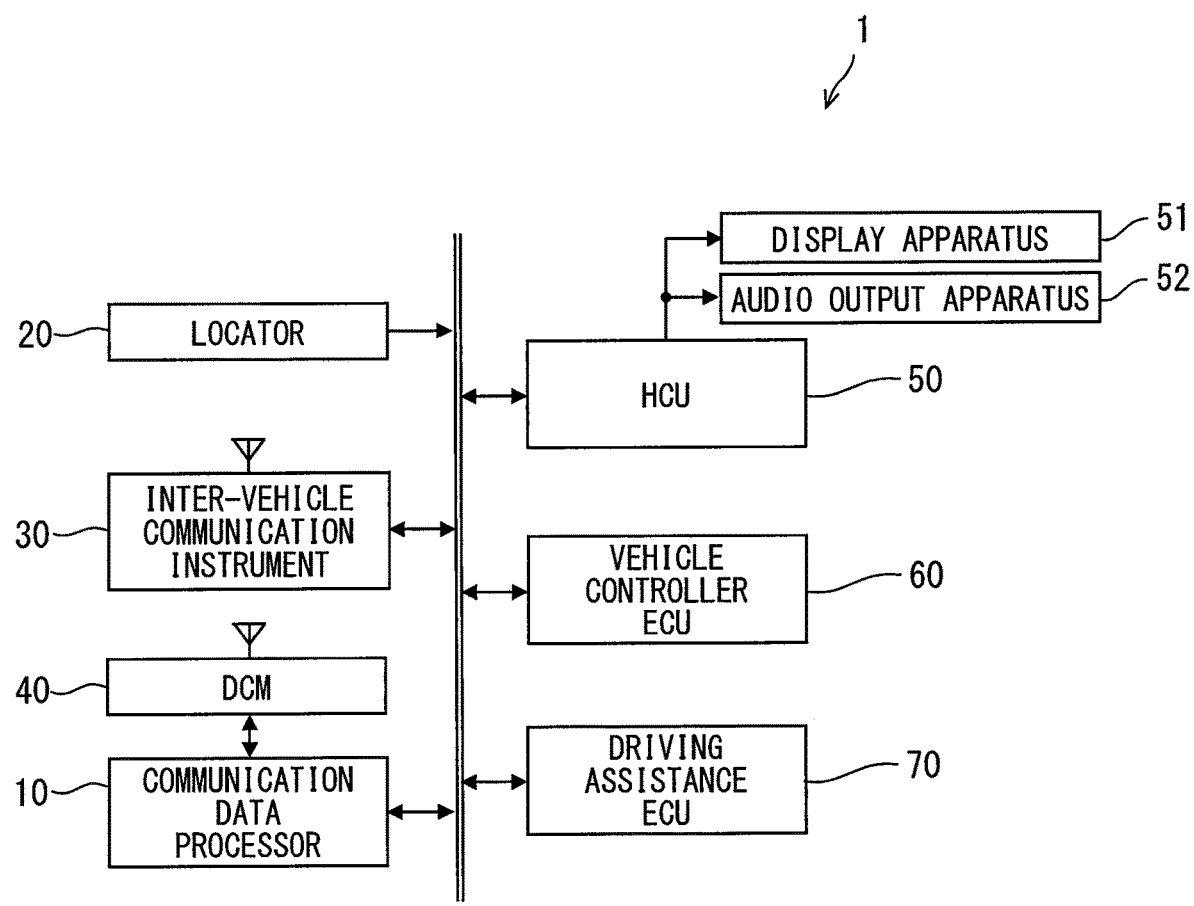
FIG. 2 is a diagram illustrating an example of a schematic configuration of a vehicle-side unit.

The description below explains a schematic configuration of the vehicle-side unit 1 with reference to FIG. 2. As illustrated in FIG. 2, the vehicle-side unit 1 includes a communication data processor 10, a locator 20, an inter-vehicle communication instrument 30, a DCM (Data Communication Module) 40, a HCU (Human Machine Interface Control Unit) 50, a vehicle controller ECU 60, and a driving assistance ECU 70. For example, the communication data processor 10, the locator 20, the inter-vehicle communication instrument 30, the HCU 50, the vehicle controller ECU 60, and the driving assistance ECU 70 are connected to an in-vehicle LAN and can exchange information with each other through the communication. The foregoing is only an example. The DCM 40 may be connected to the in-vehicle LAN. The inter-vehicle communication instrument 30 may not be connected to the in-vehicle LAN but may be connected to the communication data processor 10.

A locator 20 includes a GNSS (Global Navigation Satellite System) receiver, an inertia sensor such as a 3D gyro sensor, and a map database (hereinafter denoted as DB) to store map data. The GNSS receiver receives positioning signals from a plurality of artificial satellites. The 3D gyro sensor includes a 3-axis gyro sensor and a 3-axis acceleration sensor, for example. The locator 20 measures vehicle positions of the subject vehicle by combining a positioning signal received by the GNSS receiver and a measuring result from the inertia sensor. The vehicle position can be represented as latitude/longitude coordinates, for example.

The locator 20 reads map data from the map DB. The map data provides road information such as link data and node data around the subject vehicle. The locator 20 outputs the vehicle position of the subject vehicle and the read map data around the subject vehicle to an in-vehicle LAN. The link data includes a unique number specifying a link (link ID), a link length indicating the length of a link, a link direction, shape information about a link, node coordinates (latitude/longitude) corresponding to the beginning and the end of a link, and a road attributed. The road attribute includes a road name, a road type, a road width, the number of lanes, and a speed limit value. The node data includes a node ID assigned a unique number corresponding to each node on the map, node coordinates, a node name, a node type, a connection link ID denoting the link ID of a link connected to the node, and an intersection type.

The locator 20 may be optional when the vehicle-side unit 1 includes an apparatus to detect vehicle positions of the subject vehicle and memory to store the map data. An onboard navigation system may be used, for example.

The inter-vehicle communication instrument 30 is provided as a communication module that performs the inter-vehicle communication with the inter-vehicle communication instrument 30 of the vehicle-side unit 1 mounted on a nearby vehicle around the subject vehicle. The inter-vehicle communication instrument 30 includes a narrowband communication antenna and a narrowband transceiver. The narrowband communication antenna transmits and receives radio waves of frequency bands used for the inter-vehicle communication. The narrowband transceiver demodulates a signal received at the narrowband communication antenna and outputs the signal to the communication data processor 10. The narrowband transceiver modulates data input from the communication data processor 10 and outputs the data to the narrowband communication antenna. The data output to the narrowband communication antenna is transmitted from the narrowband communication antenna.

The DCM 40 is provided as a communication module used for telematics. The DCM 40 includes a wide area communication antenna and a wide area transceiver. The wide area communication antenna transmits and receives radio waves of frequency bands used for wireless communication with a base station of the public telecommunication network. The wide area transceiver demodulates a signal received at the wide area communication antenna and outputs the signal to the communication data processor 10. The wide area transceiver modulates data input from the communication data processor 10 and outputs the data to the wide area communication antenna. The data output to the wide area communication antenna is transmitted from the wide area communication antenna. The communication module used for telematics has been described as an example of the communication module used for the communication via the center. However, the communication module is not limited to the one used for telematics if the communication module can communicate with the center 2 via the public telecommunication network.

An HCU 50 includes a CPU, volatile memory, nonvolatile memory, I/O, and a bus connecting these components. The HCU 50 performs various processes by executing a control program stored in the nonvolatile memory. For example, information is provided from a display apparatus 51 and an audio output apparatus 52. The display apparatus 51 includes a combination meter, CID (Center Information Display), and HUD (Head-Up Display), for example. Information is provided by displaying text and/or images. The audio output apparatus 52 includes an audio speaker, for example, to provide information audibly.

The vehicle controller ECU 60 is available as an electronic control device that performs acceleration and deceleration control and/or steering control over the subject vehicle. The vehicle controller ECU 60 includes a steering ECU to perform the steering control, and a power unit control ECU and a brake ECU to perform the acceleration and deceleration. The vehicle controller ECU 60 acquires detection signals output from sensors such as an accelerator position sensor, a brake pedal force sensor, a steering angle sensor, and a vehicle speed sensor mounted on the subject vehicle. The vehicle controller ECU 60 outputs control signals to travel control devices such as an electronically controlled throttle, a brake actuator, and an EPS (Electric Power Steering) motor. The vehicle controller ECU 60 can output detection signals from the above-mentioned sensors to the in-vehicle LAN.

The driving assistance ECU 70 is configured as a computer including a CPU, volatile memory, nonvolatile memory, I/O, and a bus connecting these components. The driving assistance ECU 70 performs various processes by executing a control program stored in the nonvolatile memory. For example, the driving assistance ECU 70 performs a driving assistance that assists driving of the subject vehicle based on the vehicle information about the nearby vehicle around the subject vehicle acquired from the communication data processor 10, and the vehicle position and the map data for the subject vehicle acquired from the locator 20.

Driving assistance examples include collision avoidance assistance and right turn assistance. The collision avoidance assistance prevents the subject vehicle from colliding with a leading vehicle. The right turn assistance prevents the subject vehicle from colliding with a straight oncoming vehicle when the subject vehicle turns to the right. For example, the collision avoidance assistance may be performed when a driving assistance ECU 70 determines that the subject vehicle goes straight based on a signal from a turn signal lever of the subject vehicle. The right turn assistance may be performed when the driving assistance ECU 70 determines that the subject vehicle turns to the right based on a signal from the turn signal lever of the subject vehicle. One or more ICs as hardware may provide all or part of functions performed by the driving assistance ECU 70.

A communication data processor 10 is configured as a computer including volatile memory, nonvolatile memory, I/O, and a bus connecting these components. The communication data processor 10 performs various processes by executing a control program stored in the nonvolatile memory. For example, the communication data processor 10 generates and transmits vehicle information containing a state quantity concerning subject vehicle traveling. Information used for the driving assistance is generated by using vehicle information about the subject vehicle generated in the subject vehicle and vehicle information about a nearby vehicle acquired from the nearby vehicle through the use of communication. Moreover, a cycle to generate vehicle information about the subject vehicle is changed to decrease a difference in the time to generate vehicle information about the subject vehicle and vehicle information about the nearby vehicle. One or more ICs as hardware may provide all or part of functions performed by the communication data processor 10. The communication data processor 10 will be described in detail below.

<Schematic Configuration of Communication Data Processor 10>

Figure 3:
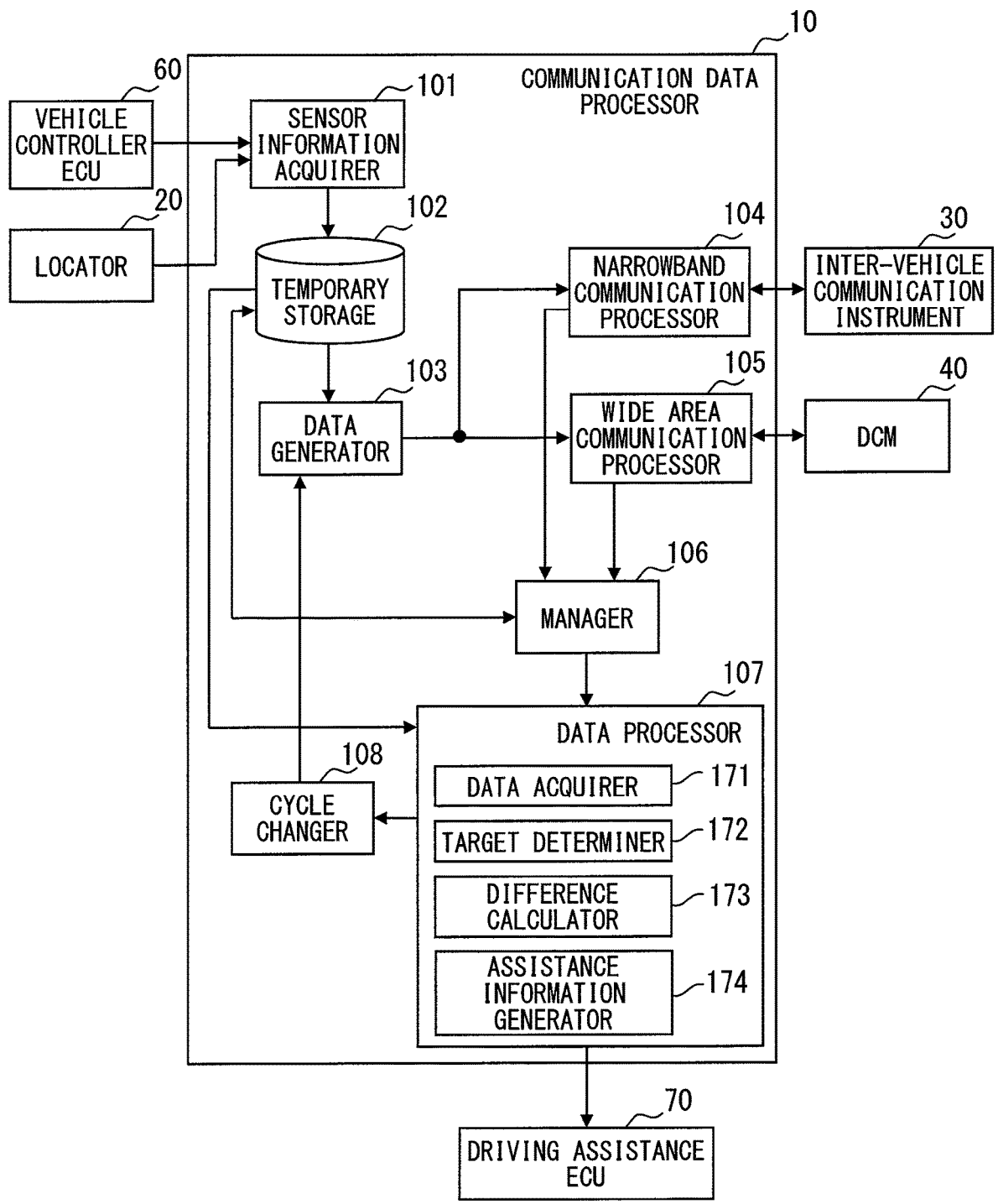
FIG. 3 is a diagram illustrating an example of a schematic configuration of a communication data processor.

The description below explains a schematic configuration of the communication data processor 10 with reference to FIG. 3. As illustrated in FIG. 3, the communication data processor 10 includes function blocks such as a sensor information acquirer 101, a temporary storage 102, a data generator 103, a narrowband communication processor 104, a wide area communication processor 105, a manager 106, a data processor 107, and a cycle changer 108. The communication data processor 10 is comparable to a vehicle communication control device.

The sensor information acquirer 101 acquires sensor information, namely, various information that is output from the locator 20 and a vehicle controller ECU 60 via a vehicle LAN and represents state quantities concerning subject vehicle traveling. Various sensors detect the state quantities. The sensor information includes a vehicle position, a speed, and an orientation (namely, a traveling direction) of the subject vehicle, for example. The sensor information acquirer 101 may acquire the sensor information from various sensors without using the ECU. The temporary storage 102 stores the sensor information acquired by the sensor information acquirer 101 for a predetermined time period. The temporary storage 102 may be provided as nonvolatile memory.

The data generator 103 generates vehicle information indicating a running condition of the subject vehicle at the time of generating the vehicle information at a predetermined generation cycle based on the sensor information stored in the temporary storage 102. The generation cycle may be set to 100 msec, for example. The vehicle information generated by the data generator 103 is stored in the temporary storage 102 for a predetermined time period and is supplied to the narrowband communication processor 104 and the wide area communication processor 105. The data generator 103 is comparable to a subject vehicle information generator.

Each time the data generator 103 supplies vehicle information, the narrowband communication processor 104 generates a data packet containing the vehicle information and outputs the data packet to an inter-vehicle communication instrument 30. The data packet containing the vehicle information contains a time stamp indicating the time to generate the vehicle information and identification information to identify a transmission origin of the vehicle information in addition to the vehicle information about the subject vehicle. The description below explains an example of using the identification information as a vehicle ID of the subject vehicle. The inter-vehicle communication instrument 30 modulates a data packet supplied from the narrowband communication processor 104 and broadcasts the data packet. For example, a generation cycle to generate the vehicle information by the data generator 103 may correspond to a transmission cycle for the narrowband communication processor 104 to transmit data packets.

The narrowband communication processor 104 acquires a data packet containing the vehicle information about the nearby vehicle via the inter-vehicle communication instrument 30. That data packet is transmitted from the narrowband communication processor 104 of the vehicle-side unit 1 mounted on the nearby vehicle in relation to the subject vehicle. The data packet containing the vehicle information about the nearby vehicle contains the time stamp indicating the time to generate the vehicle information and the vehicle ID of this nearby vehicle in addition to the vehicle information representing running conditions such as the vehicle position, the speed, and the orientation of the nearby vehicle similarly to the data packet containing the vehicle information about the subject vehicle as above. The narrowband communication processor 104 provides the acquired data packet to the manager 106.

The wide area communication processor 105 generates a data packet that is common to the data packet generated in the narrowband communication processor 104 and contains the vehicle information generated by the data generator 103. The generated data packet is output to a DCM 40. In this context, being common signifies consistency in the vehicle information, the time stamp, and the vehicle ID. The wide area communication processor 105 may generate a data packet at a generation cycle corresponding to an integral multiple of the cycle for the narrowband communication processor 104 to generate a data packet, for example. The data packet may be generated at a generation cycle equal to the cycle for the narrowband communication processor 104 to generate a data packet. When the data packet is input from the wide area communication processor 105, the DCM 40 transmits the data packet to a center 2 via a base station and a public communication network. The data packet transmitted from the DCM 40 is transmitted to the nearby vehicle in relation to the subject vehicle via the base station, the public communication network, and the center 2.

The wide area communication processor 105 of the vehicle-side unit 1 mounted on the nearby vehicle in relation to the subject vehicle transmits the data packet containing the vehicle information about the nearby vehicle via the center 2. The wide area communication processor 105 acquires this data packet via the DCM 40. The wide area communication processor 105 supplies the acquired data packet to the manager 106.

A data packet may be acquired from one of the narrowband communication processor 104 and the wide area communication processor 105. In this case, the manager 106 determines whether the acquired data packet and the data packet stored in the temporary storage 102 maintain the same contents. In this context, the same contents signify uniformity in terms of the time stamp, the vehicle ID, and the vehicle information contained in the data packet. Whether the data packet maintains the same contents can be determined by determining whether the time stamp and the vehicle ID equate with the corresponding ones. The time stamp and the vehicle ID equate with the corresponding ones only when the nearby vehicle transmits common data packets via a plurality of types of communication paths such as the inter-vehicle communication and the communication via the center and the vehicle-side unit 1 of the subject vehicle also receives the common data packets.

The manager 106 may determine that the contents of the acquired data packet differ from the contents of the data packet stored in the temporary storage 102. In this case, the manager 106 delivers the data packet to the data processor 107 and stores the data packet in the temporary storage 102 for a predetermined time period. The manager 106 may determine that the contents of the acquired data packet equal the contents of the data packet stored in the temporary storage 102. In this case, the manager 106 discards the acquired data packet. A common data packet may be transmitted via the types of communication paths such as the inter-vehicle communication and the communication via the center. In this case, the temporary storage 102 stores the data packet output from the narrowband communication processor 104 or the wide area communication processor 105, whichever acquires the data packet first.

The data processor 107 includes a data acquirer 171, a target determiner 172, a difference calculator 173, and an assistance information generator 174. The description below explains the data acquirer 171, the target determiner 172, the difference calculator 173, and the assistance information generator 174 included in the data processor 107.

The data acquirer 171 acquires data packets successively supplied from the manager 106. The data packet arrives from the nearby vehicle based on communication outside the subject vehicle. The data acquirer 171 is comparable to a nearby vehicle information acquirer. The communication data processor 10 included in the vehicle-side unit 1 mounted on the nearby vehicle is comparable to an in-vehicle unit.

The target determiner 172 determines a nearby vehicle to be prioritized as a prioritized target out of nearby vehicles from which the data acquirer 171 acquires data packets. The nearby vehicle as a prioritized target is determined by using the vehicle information about nearby vehicle and the vehicle information about subject vehicle. The vehicle information about nearby vehicle concerns the nearby vehicles from which the data acquirer 171 acquires data packets within a predetermined time period such as 100 msec, for example. The vehicle information about subject vehicle is generated in the data generator 103. The prioritized target corresponds to a nearby vehicle most preferentially targeted at the driving assistance.

According to the embodiment, the description below explains a case of determining one of nearby vehicles as a prioritized target on condition that the nearby vehicle indicates the shortest TTC (time to collision) with the subject vehicle. The TTC is calculated based on the vehicle position, the speed, and the orientation contained in the vehicle information. The TTC can be calculated by dividing a distance from the vehicle position of the subject vehicle to an estimated crossing position with the nearby vehicle by a relative speed at the vehicle position in relation to the subject vehicle.

The estimated crossing position can be determined based on a vehicular swept path of the subject vehicle estimated from the vehicle position and the orientation of the subject vehicle and a vehicular swept path of the nearby vehicle estimated from the vehicle position and the orientation of the nearby vehicle. The assistance information generator 174 may calculate the TTC. There may be a case where the data acquirer 171 acquires data packets from only one nearby vehicle within a predetermined time period. In such a case, the target determiner 172 may determine this nearby vehicle as a target.

The difference calculator 173 calculates a difference between the generation time to generate the most recent vehicle information about the nearby vehicle determined as a target by the target determiner 172 and the generation time to generate the most recent vehicle information about the subject vehicle generated by the data generator 103. An example is to calculate a difference found by subtracting the generation time to generate the most recent vehicle information about the nearby vehicle from the generation time to generate the most recent vehicle information about the subject vehicle. The generation time to generate the most recent vehicle information about the nearby vehicle determined as a target can be specified from the time stamp contained in the most recent data packet acquired by the data acquirer 171 in terms of the nearby vehicle.

Namely, the difference calculation uses the generation time to generate the first arriving one of the pieces of common vehicle information transmitted via various types of communication paths. The generation time to generate the most recent vehicle information about the subject vehicle can be specified from the time stamp contained in the vehicle information stored in the temporary storage 102. The difference calculator 173 outputs the calculated difference to the cycle changer 108.

The assistance information generator 174 generates assistance information used for driving assistance in the subject vehicle by using the vehicle information contained in nearby vehicle data packets successively acquired by the data acquirer 171 and the vehicle information about the subject vehicle successively generated by the data generator 103. An example is to calculate the TTC between the subject vehicle and the nearby vehicle from the most recent vehicle information about the nearby vehicle as a target determined by the target determiner 172 and the most recent vehicle information about the subject vehicle generated by the data generator 103. The calculated TTC is output as the assistance information to the driving assistance ECU 70.

The TTC is output from the assistance information generator 174 to the driving assistance ECU 70 and is used for driving assistance in the driving assistance ECU 70. When the TTC is smaller than or equal to a threshold value, for example, the driving assistance ECU 70 may issue an instruction to the HCU 50 and call attention by providing information from the display apparatus 51 and/or the audio output apparatus 52. Alternatively, when the TTC is smaller than or equal to a threshold value, the driving assistance ECU 70 may issue an instruction to the vehicle controller ECU 60 to control deceleration of the subject vehicle or control steering of the subject vehicle.

The cycle changer 108 changes a generation cycle in the data generator 103 to generate the vehicle information about the subject vehicle so as to decrease a difference calculated by the difference calculator 173. For example, when the difference calculator 173 inputs a positive difference value, it just needs to shorten the generation cycle for the vehicle information about the subject vehicle so as to correspond to the difference. Alternatively, when the difference calculator 173 inputs a negative difference value, it just needs to extend the generation cycle for the vehicle information about the subject vehicle so as to correspond to the difference.

Figure 4:
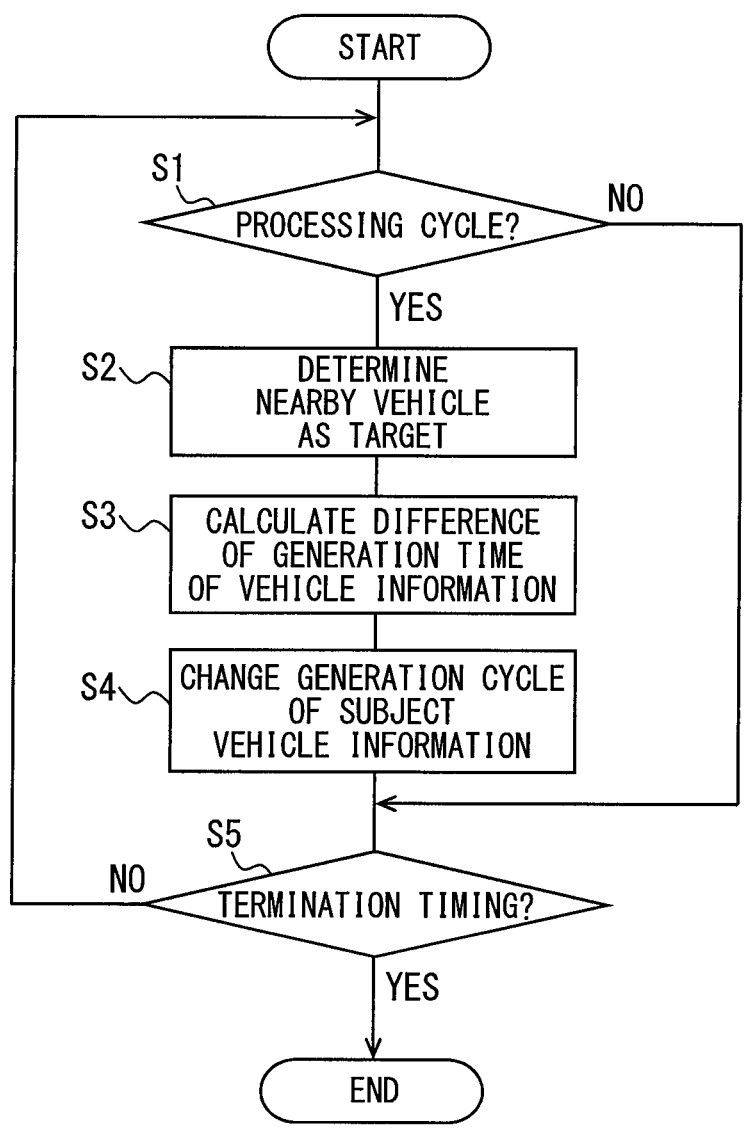
FIG. 4 is a flowchart illustrating an example of a flow of a generation cycle changing and related process on the communication data processor.

The description below explains a process (hereinafter referred to as a generation cycle changing and related process) related to changing the generation cycle of the vehicle information in the communication data processor 10. The flowchart in FIG. 4 may start when an ignition power supply for the subject vehicle turns on, for example.

At step S1, when a processing cycle is available (YES at S1), the process proceeds to step S2. When the processing cycle is unavailable (NO at S1), the process proceeds to step S5. The processing cycle can be set to any value such as 100 msec. At step S2, the target determiner 172 determines the nearby vehicle as a prioritized target based on a nearby vehicle data packet acquired by the data acquirer 171 within the processing cycle.

At step S3, the difference calculator 173 calculates a difference between generation time to generate the most recent vehicle information about the nearby vehicle determined as a target at S2 and the generation time for the data generator 103 to generate the most recent vehicle information for the subject vehicle. At step S4, the cycle changer 108 changes the generation cycle in the data generator 103 to generate the vehicle information about the subject vehicle based on the difference calculated at S3 so as to decrease the difference.

At step S5, the generation cycle changing and related process may reach termination timing (YES at S5). In this case, the generation cycle changing and related process terminates. The generation cycle changing and related process may not reach the termination timing (NO at S5). In this case, the process returns to S1 and is repeated. The timing to terminate the generation cycle changing and related process may correspond to turning off the ignition power supply for the subject vehicle, for example.

According to the above-mentioned configuration of the first embodiment, the generation cycle for the vehicle information about the subject vehicle is shortened by the time corresponding to a difference found by subtracting the generation time to generate the most recent vehicle information about the nearby vehicle determined as a prioritized target from the generation time to generate the most recent vehicle information about the subject vehicle. It is therefore possible to reduce a difference between the generation time for the vehicle information acquired next from the nearby vehicle via the communication and the generation time for the vehicle information generated next in the subject vehicle.

The assistance information generated in the assistance information generator 174 by using these pieces of information more accurately reflects the actual running condition relation between the subject vehicle and the nearby vehicle. For example, the assistance information provided as TTC more accurately reflects the actual positional relation and speed difference between the subject vehicle and the nearby vehicle. The driving assistance ECU 70 using the assistance information can therefore provide the driving assistance more accurately reflecting the actual running condition relation between the subject vehicle and the nearby vehicle. As a result, it is possible to minimize dissatisfaction of a driver with the driving assistance using vehicle information about the nearby vehicle acquired by communication from outside the subject vehicle and vehicle information about the subject vehicle acquired in the subject vehicle.

According to the configuration of the first embodiment, the most highly prioritized nearby vehicle targeted at the driving assistance is determined as a target from nearby vehicles about which the communication data processor 10 acquires the vehicle information. The driving assistance ECU 70 can therefore provide the driving assistance more accurately reflecting the actual running condition relation between the most highly prioritized nearby vehicle targeted at the driving assistance and the subject vehicle. Moreover, the configuration of the first embodiment successively determines the most highly prioritized nearby vehicle targeted at the driving assistance. The targeted nearby vehicle can therefore be changed accordingly when a variation in the running situation changes the most highly prioritized nearby vehicle targeted at the driving assistance.

The assistance information generated in the assistance information generator 174 is favorably used for the driving assistance that assists in driving for a driver by controlling the subject vehicle travel. This is because a difference between the generation time of the vehicle information about the subject vehicle and generation time of the vehicle information about the nearby vehicle more greatly affects the driving assistance in driving for a driver by controlling the subject vehicle travel than the driving assistance providing an alarm.

(First Modification)

According to the first embodiment, the target determiner 172 determines, as a prioritized target, the nearby vehicle indicating the shortest TTC in relation to the subject vehicle, but is not limited thereto. For example, a distance between the subject vehicle and each of nearby vehicles may be calculated based on vehicle positions contained in the vehicle information. The nearby vehicle indicating the shortest distance calculated may be determined as a prioritized target. Moreover, a prioritized target may be determined according to types of the driving assistance performed in addition to the TTC or the distance between vehicles.

Suppose a weighting example that increases the weight corresponding to a decrease in the TTC or the distance between vehicles and applies a larger weight to the collision avoidance assistance than the right turn assistance. In this case, a nearby vehicle to be prioritized may be more weighted corresponding to the type of the driving assistance performed. For example, a straight oncoming vehicle is more weighted than a leading vehicle in relation to the subject vehicle when the subject vehicle performs the right turn assistance. A leading vehicle is more weighted than a straight oncoming vehicle in relation to the subject vehicle when the subject vehicle performs the collision avoidance assistance. The weight for the TTC or the distance between vehicles is integrated with the weight for the type of driving assistance to be performed. The nearby vehicle indicating the largest integrated weight can be determined as a prioritized target. It is possible to preferentially determine the nearby vehicle as a prioritized target for the driving assistance depending on the type of driving assistance performed.

Second Embodiment

The first embodiment provides the configuration that changes the generation cycle for the vehicle information about the subject vehicle and thereby suppresses a difference between the time to generate the vehicle information about the subject vehicle and the time to generate the vehicle information about the nearby vehicle used to generate the assistance information. However, the configuration is not limited thereto. For example, a second embodiment provides a configuration that changes the generation cycle for the vehicle information about the nearby vehicle and thereby suppresses a difference between the time to generate the vehicle information about the subject vehicle and the time to generate the vehicle information about the nearby vehicle used to generate the assistance information.

The description below explains the second embodiment of the present disclosure with reference to the accompanying drawings. The driving assistance system 3 according to the second embodiment equals the driving assistance system 3 according to the first embodiment except that the vehicle-side unit 1 includes a communication data processor 10a instead of the communication data processor 10.

<Schematic Configuration of Communication Data Processor 10a>

Figure 5:
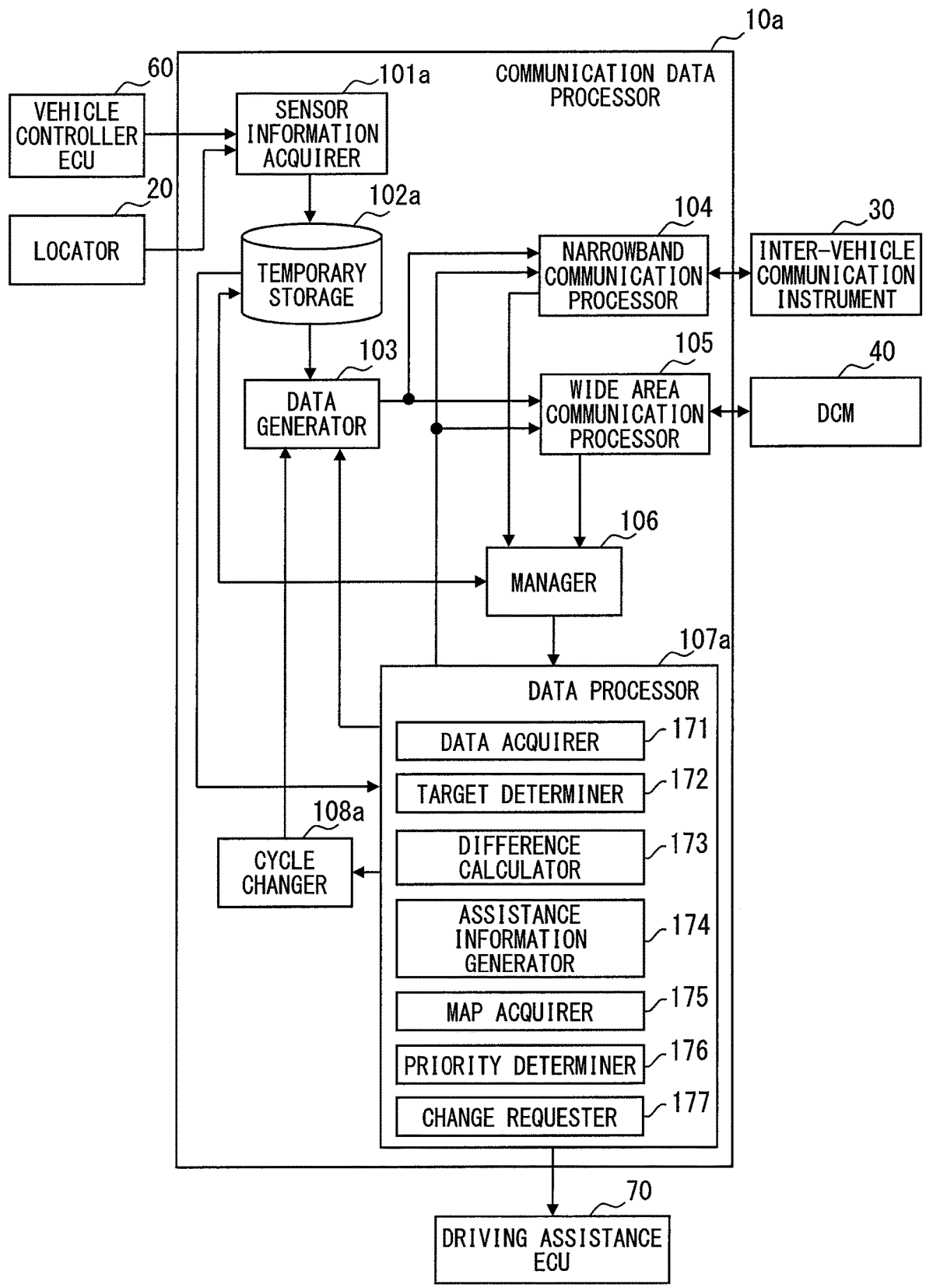
FIG. 5 is a diagram illustrating an example of a schematic configuration of a communication data processor.

The communication data processor 10a will be described with reference to FIG. 5. As illustrated in FIG. 5, the communication data processor 10a includes function blocks such as a sensor information acquirer 101a, a temporary storage 102a, a data generator 103, a narrowband communication processor 104, a wide area communication processor 105, a manager 106, a data processor 107a, and a cycle changer 108a. The communication data processor 10a is also comparable to the vehicle communication control device.

The sensor information acquirer 101a equals the sensor information acquirer 101 according to the first embodiment except acquiring map data output from the locator 20 around the subject vehicle in addition to the above-mentioned sensor information. The temporary storage 102a stores the map data around the subject vehicle acquired by the sensor information acquirer 101a for a predetermined time period. The temporary storage 102a equals the temporary storage 102 according to the first embodiment except storing map data around the subject vehicle acquired by the sensor information acquirer 101a.

As illustrated in FIG. 5, the data processor 107a includes a data acquirer 171, a target determiner 172, a difference calculator 173, an assistance information generator 174, a map acquirer 175, a priority determiner 176, and a change requester 177. The data processor 107a equals the data processor 107 according to the first embodiment except including the map acquirer 175, the priority determiner 176, and the change requester 177. The description below explains the map acquirer 175, the priority determiner 176, and the change requester 177 included in the data processor 107a.

The map acquirer 175 acquires the most recent map data around the subject vehicle stored in the temporary storage 102. The priority determiner 176 determines which vehicle, the nearby vehicle or the subject vehicle, should be prioritized, by using the most recent vehicle position of the nearby vehicle contained in the data packet acquired by the data acquirer 171, the most recent vehicle position contained in the vehicle information about the subject vehicle generated by the data generator 103, and the map data acquired by the map acquirer 175. The priority determiner 176 can determine which vehicle, the nearby vehicle determined as a target by the target determiner 172 or the subject vehicle, should be prioritized, for example.

Which vehicle, the nearby vehicle or the subject vehicle, is prioritized can be determined based on which vehicle, the subject vehicle or the nearby vehicle, is located on a priority road, for example. Distinction between a priority road and a non-priority road may be made on condition that the priority road includes a large number of lanes and the non-priority road includes a small number of lanes. Alternatively, it may be possible to determine that the priority road is wide and the non-priority road is narrow. A combination of these may be used for the determination. For example, the priority road or the non-priority road may be determined based on the number of lanes and based on the road widths when there is no difference between the numbers of lanes. The other map data elements such as road types may be used to determine the priority road or the non-priority road.

Suppose the priority determiner 176 determines that the nearby vehicle is prioritized. In this case, similarly to the first embodiment, a change is made to the generation cycle for the data generator 103 to generate the vehicle information about the subject vehicle so as to decrease a difference calculated by the difference calculator 173. Suppose the priority determiner 176 determines that the subject vehicle is prioritized. In this case, the change requester 177 issues a request to the vehicle-side unit 1 of the nearby vehicle so as to change the generation cycle of the vehicle information. The change requester 177 will be described below.

When the priority determiner 176 determines that the subject vehicle is prioritized, the change requester 177 issues request information to the vehicle-side unit 1 of the nearby vehicle determined as a target by the target determiner 172. The request information requests a change in the generation cycle of the vehicle information. For example, the request information contains a difference calculated by the difference calculator 173 between the subject vehicle and the targeted nearby vehicle. The description below according to the embodiment uses an example where the request information contains a difference calculated in the difference calculator 173 by subtracting the generation time to generate the most recent vehicle information about the targeted nearby vehicle from the generation time to generate the most recent vehicle information about the subject vehicle.

The change requester 177 transmits the request information to the wide area communication processor 105, for example. The request information is thereby transmitted to the targeted nearby vehicle via the wide area communication processor 105, the DCM 40, and the center 2. In this case, the wide area communication processor 105 generates a data packet containing the request information. The data packet containing the request information is transmitted to the targeted nearby vehicle from the DCM 40 via the center 2 similarly to the data packet containing the vehicle information as described in the first embodiment. It is favorable to use a communication method capable of transmitting the request information by specifying a transmission destination. The request information may be transmitted along with the vehicle information when transmitted.

The data packet containing the request information, after transmitted, is received at the DCM 40 of the vehicle-side unit 1 mounted on the nearby vehicle and is transmitted to the wide area communication processor 105 of the communication data processor 10a on the nearby vehicle. The data packet is transmitted to the cycle changer 108a from the wide area communication processor 105 via the manager 106 and the data processor 107a.

The cycle changer 108a is similar to the cycle changer 108 according to the first embodiment except that the cycle changer 108a changes the generation cycle for the vehicle information about the subject vehicle based on the request information contained in the data packet transmitted from the data processor 107a. The cycle changer 108a changes the generation cycle for the data generator 103 to generate the vehicle information about the subject vehicle so as to decrease the difference contained in the request information. In the example according to the present embodiment, the difference contained in the request information is found by subtracting the generation time to generate the vehicle information about the subject vehicle from the generation time to generate the vehicle information about another vehicle as an origin to transmit the request information. When the difference contained in the request information represents a positive value, the generation cycle for the vehicle information about the subject vehicle needs to be increased to meet the time corresponding to the difference. When the difference contained in the request information represents a negative value, the generation cycle for the vehicle information about the subject vehicle needs to be decreased to meet the time corresponding to the difference.

Figure 6:
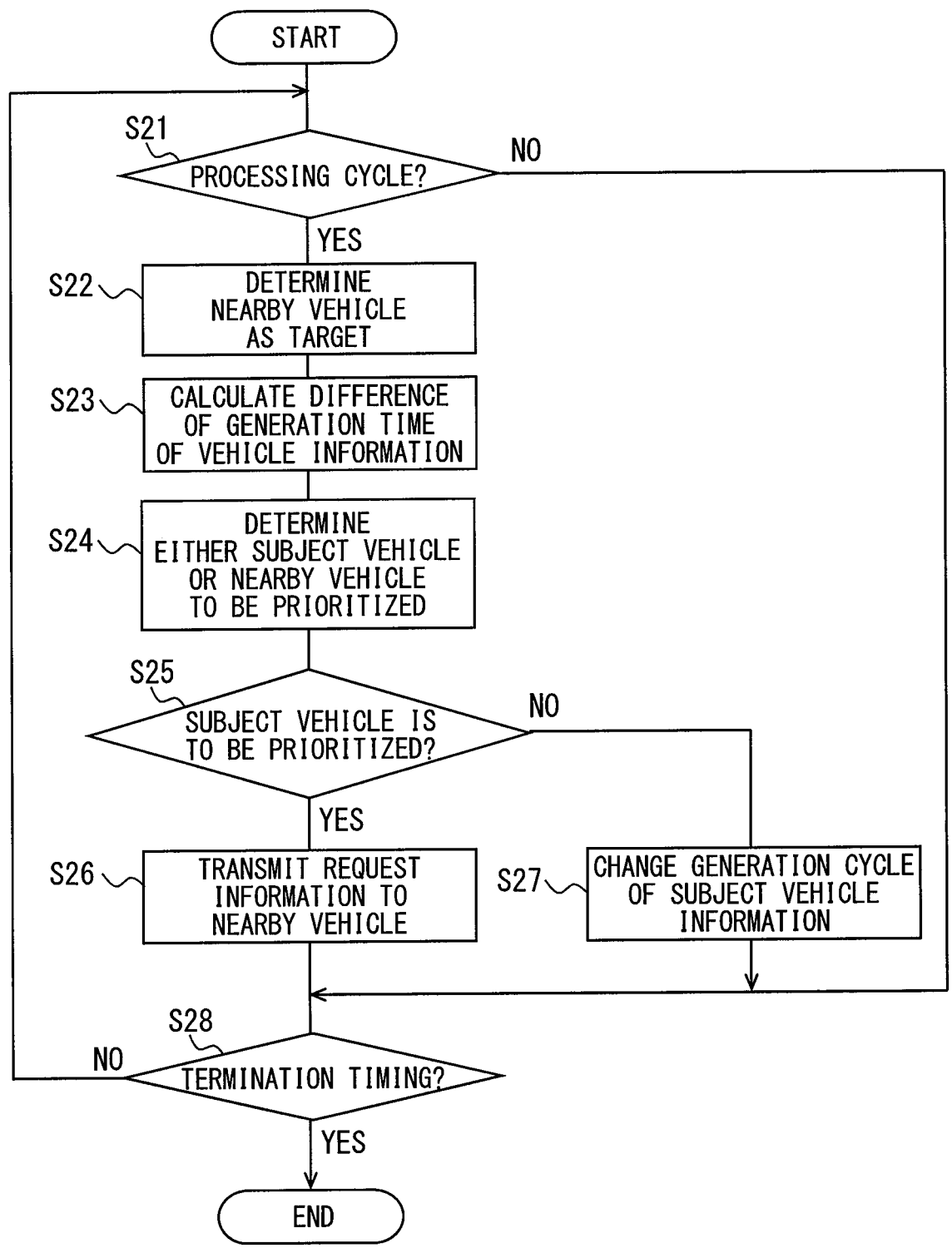
FIG. 6 is a flowchart illustrating an example of a flow of a generation cycle changing and related process on the communication data processor.

A flowchart in FIG. 6 is used to illustrate a flow of the generation cycle changing and related process concerning a change in the generation cycle for the vehicle information in the communication data processor 10a. The flowchart in FIG. 6 may start when an ignition power supply of the subject vehicle turns on, for example. However, the following assumes that the flowchart starts when the subject vehicle enters the vicinity of a predetermined position. The vicinity of the predetermined position can signify an area within a predetermined distance from the center of an intersection with no traffic light or an area within a predetermined distance from a high-accident location. The data processor 107a may determine entry into the vicinity of the predetermined position based on the vehicle position of the subject vehicle and map data, for example.

Step S21 is similar to S1 as above. The process proceeds to step S22 when a processing cycle is available (YES at S21). The process proceeds to step S28 when a processing cycle is unavailable (NO at S21). The process at step S22 and step S23 equals that at S2 and S3 as above.

At step S24, the priority determiner 176 determines which vehicle, the nearby vehicle determined as a target at S24 or the subject vehicle, is prioritized. At step S25, when the priority determiner 176 determines that the subject vehicle is prioritized (YES at S25), the process proceeds to S26. When the priority determiner 176 determines that the nearby vehicle is prioritized (NO at S25), the process proceeds to step S27.

At step S26, the change requester 177 transmits request information to the vehicle-side unit 1 of the nearby vehicle determined as a target at S24. The request information requests a change in the generation cycle of the vehicle information. The process then proceeds to step S28. The process at step S27 equals that at S4 above.

At step S28, when the generation cycle changing and related process reaches the termination timing (YES at S28), the generation cycle changing and related process terminates. When the generation cycle changing and related process does not reach the termination timing (NO at S28), the process returns to S21 and is repeated. The generation cycle changing and related process may reach the termination timing when the subject vehicle exits from the vicinity of a predetermined position or when the ignition power supply of the subject vehicle turns off, for example. The data processor 107a may determine exit from the vicinity of the predetermined position based on the vehicle position of the subject vehicle and map data, for example.

The second embodiment shortens the generation cycle for the vehicle information about the targeted nearby vehicle by the time corresponding to a difference found by subtracting the generation time to generate the most recent vehicle information about the nearby vehicle from the generation time to generate the most recent vehicle information about the subject vehicle. It is therefore possible to eliminate a difference between the generation time for the vehicle information acquired next from the nearby vehicle via the communication and the generation time for the vehicle information generated next in the subject vehicle. The second embodiment can therefore also minimize dissatisfaction of a driver with the driving assistance using vehicle information about the nearby vehicle acquired by communication from outside the subject vehicle and vehicle information about the subject vehicle acquired in the subject vehicle. The second embodiment can suppress a difference in the vehicle information generation time between a vehicle traveling the priority road and a vehicle traveling the non-priority road without changing the generation cycle for the vehicle information about the vehicle traveling the priority road.

(Second Modification)

As has been described, the second embodiment determines which vehicle, the nearby vehicle or the subject vehicle, should be prioritized, based on which vehicle, the nearby vehicle or the subject vehicle, is located on the priority road. However, the embodiment is not limited thereto. It may be possible to prioritize the subject vehicle or the nearby vehicle based on other factors such as a distance from a predetermined position, namely, to prioritize the subject vehicle or the nearby vehicle whichever indicates its vehicle position nearer to a predetermined position. The predetermined position signifies any configurable spot such as the center of an intersection with no traffic light or a high-accident location.

(Third Modification)

According to the above-mentioned embodiments, plural types of communication paths transmit the common vehicle information to the communication data processor 10, but not limited thereto. Only one type of communication path may be used, for example.

(Fourth Modification)

The above-mentioned embodiment provides the communication data processor 10 or 10a separately from communication modules such as the inter-vehicle communication instrument 30 and the DCM 40, but is not limited thereto. For example, the communication data processor 10 or 10a may be integrated with the above-mentioned communication modules.

(Fifth Modification)

The above-mentioned embodiment provides the communication data processor 10 or 10a separately from the driving assistance ECU 70, but is not limited thereto. For example, the communication data processor 10 or 10a may be integrated with the driving assistance ECU 70.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

What is claimed is:

1. A vehicle communication control device used for a vehicle, comprising:
   a nearby vehicle information acquirer configured to successively acquire nearby vehicle information representing a running condition of at least one nearby vehicle around a subject vehicle and a generation time of the nearby vehicle information, wherein the nearby vehicle information and the generation time of the nearby vehicle information are generated in an in-vehicle unit mounted on the at least one nearby vehicle and successively transmitted by communication from outside the subject vehicle;
   a subject vehicle information generator configured to cyclically generate subject vehicle information representing a running condition of the subject vehicle;
   an assistance information generator configured to generate assistance information for driving assistance of the subject vehicle by using the nearby vehicle information and the subject vehicle information;
   a difference calculator configured to calculate a difference between a generation time of most recent subject vehicle information and a generation time of most recent nearby vehicle information; and
   a cycle changer configured to change a generation cycle of the subject vehicle information in the subject vehicle information generator so as to decrease the difference between the generation time of the nearby vehicle information and a generation time of the subject vehicle information.

2. The vehicle communication control device according to claim 1,
   wherein the assistance information generator uses the most recent nearby vehicle information and the most recent subject vehicle information to generate the assistance information for the driving assistance that assists driving of a driver by controlling travel of the subject vehicle.

3. The vehicle communication control device according to claim 1,
   wherein the at least one nearby vehicle includes a plurality of nearby vehicles,
   wherein the vehicle communication control device further comprises a target determiner configured to determine a nearby vehicle to be prioritized from the plurality of nearby vehicles by using the nearby vehicle information and the subject vehicle information when the nearby vehicle information acquirer acquires the nearby vehicle information of the plurality of nearby vehicles, and
   wherein the difference calculator is configured to calculate a difference between the generation time of the most recent nearby vehicle information concerning the nearby vehicle determined to be prioritized and the generation time of the most recent subject vehicle information.

4. The vehicle communication control device according to claim 1,
   wherein the nearby vehicle information acquirer is configured to acquire the nearby vehicle information including a position of the nearby vehicle,
   wherein the subject vehicle information generator is configured to generate the subject vehicle information including a position of the subject vehicle,
   wherein the vehicle communication control device further comprises:
      a map acquirer configured to acquire map data;
      a priority determiner configured to determine either the nearby vehicle or the subject vehicle to be prioritized by using the position of the nearby vehicle, the position of the subject vehicle, and the map data; and
      a change requester configured to transmit request information to the nearby vehicle, the request information requesting a change in a generation cycle of the nearby vehicle information in the nearby vehicle so as to decrease the difference between the generation time of the nearby vehicle information and a generation time of the subject vehicle information,
wherein the request information includes the difference between the generation time of the most recent subject vehicle information and the generation time of the most recent nearby vehicle information,
wherein, when the priority determiner determines that the nearby vehicle is to be prioritized, the cycle changer changes the generation cycle of the subject vehicle information in the subject vehicle information generator so as to decrease the difference between the generation time of the nearby vehicle information and a generation time of the subject vehicle information, and
wherein, when the priority determiner determines that the subject vehicle is to be prioritized, the change requester transmits the request information to the nearby vehicle.

5. The vehicle communication control device according to claim 4,
wherein, by using the position of the nearby vehicle, the position of the subject vehicle, and the map data, the priority determiner is configured to:
determine that the subject vehicle is to be prioritized when the nearby vehicle travels on a non-priority road and the subject vehicle travels on a priority road; and
determine that the nearby vehicle is to be prioritized when the nearby vehicle travels on the priority road and the subject vehicle travels the non-priority road.

6. A vehicle communication control device used in a subject vehicle, comprising:
a computer configured to:
successively acquire nearby vehicle information that includes a running condition of at least one nearby vehicle around the subject vehicle and a generation time of the nearby vehicle information, wherein the nearby vehicle information and the generation time of the nearby vehicle information are generated by an in-vehicle unit in the at least one nearby vehicle and successively transmitted from the at least one nearby vehicle by wireless communication;
cyclically generate subject vehicle information that includes a running condition of the subject vehicle;
generate assistance information using the nearby vehicle information and the subject vehicle information to provide a driving assistance to the subject vehicle;
calculate a difference between a generation time of most recent subject vehicle information and a generation time of most recent nearby vehicle information; and
change a generation cycle of the subject vehicle information so as to decrease a difference between a generation time of the subject vehicle information and the generation time of the nearby vehicle information.

7. The vehicle communication control device of claim 6, wherein the computer is further configured to generate the assistance information using the most recent nearby vehicle information and the most recent subject vehicle information.

8. The vehicle communication control device of claim 6, wherein
the at least one nearby vehicle includes a plurality of nearby vehicles, and wherein
the computer is further configured to prioritize one of the plurality of nearby vehicles using the nearby vehicle information and the subject vehicle information in response to acquiring the nearby vehicle information from the plurality of nearby vehicles and to calculate a difference between the generation time of the most recent nearby vehicle information of the prioritized one of the plurality of nearby vehicles and the most recent subject vehicle information.

9. The vehicle communication control device of claim 6, wherein
the nearby vehicle information includes a position of the nearby vehicle and the subject vehicle information includes a position of the subject vehicle, and wherein
the computer is further configured to
acquire map data,
prioritize either the nearby vehicle or the subject vehicle using the position of the nearby vehicle, the position of the subject vehicle, and the map data, and
transmit request information to the nearby vehicle, the request information requesting the nearby vehicle to change a generation cycle of the nearby vehicle information so as to decrease the difference between the generation time of the subject vehicle information and the generation time of the nearby vehicle information, and the request information including the difference between the generation time of the most recent subject vehicle information and the generation time of the most recent nearby vehicle information, and wherein
in response to prioritizing the nearby vehicle, the computer is further configured to change the generation cycle of the subject vehicle information so as to decrease the difference between the generation time of the subject vehicle information and the generation time of the nearby vehicle information, and
in response to prioritizing the subject vehicle, the computer is further configured to transmit the request information to the nearby vehicle.

10. The vehicle communication control device of claim 9, wherein the computer is further configured to
determine whether roads on which the subject vehicle and the nearby vehicle are traveling have a right of way by using the position of the nearby vehicle, the position of the subject vehicle, and the map data,
prioritize the subject vehicle in response to determining that the nearby vehicle is traveling on a road that does not have the right of way and the subject vehicle is traveling on a road that has the right of way, and
prioritize the nearby vehicle in response to determining that the nearby vehicle is traveling on the road the has the right of way and the subject vehicle is traveling on the road that does not have the right of way.

* * * * *